US009818264B2

(12) United States Patent
Karpe

(10) Patent No.: US 9,818,264 B2
(45) Date of Patent: Nov. 14, 2017

(54) PULL TAB TICKET HANDLER AND REVEALER WITH COMPUTER GENERATED DISPLAY

(71) Applicant: Craig Robert Karpe, Indianapolis, IN (US)

(72) Inventor: Craig Robert Karpe, Indianapolis, IN (US)

( * ) Notice: Subject to any disclaimer, the term of this patent is extended or adjusted under 35 U.S.C. 154(b) by 264 days.

(21) Appl. No.: 14/326,460

(22) Filed: Jul. 8, 2014

(65) Prior Publication Data

US 2016/0012668 A1 Jan. 14, 2016

(51) Int. Cl.

| | |
|---|---|
| ***G06F 17/00*** | (2006.01) |
| ***G07F 17/32*** | (2006.01) |
| ***G07F 17/42*** | (2006.01) |

(52) U.S. Cl.
CPC .......... *G07F 17/329* (2013.01); *G07F 17/326* (2013.01); *G07F 17/3253* (2013.01); *G07F 17/42* (2013.01)

(58) Field of Classification Search
CPC .... G07F 17/329; G07F 17/32; G07F 17/3244; G07F 17/326; G07F 17/42; G07F 17/3211; A63F 3/06; A63F 3/068; B26F 3/002; B41M 3/005
See application file for complete search history.

(56) References Cited

U.S. PATENT DOCUMENTS

| | | | |
|---|---|---|---|
| 4,765,842 | A | 8/1988 | Sanders et al. |
| 5,222,624 | A | 6/1993 | Burr |
| 5,253,383 | A | 10/1993 | Clark |
| 5,355,543 | A | 10/1994 | Cameron et al. |
| 5,402,549 | A | 4/1995 | Forrest |
| 5,907,882 | A | 6/1999 | Tyree |
| 5,980,385 | A | 6/1999 | Clapper, Jr. |
| 6,733,385 | B1 | 5/2004 | Enzminger et al. |
| 6,886,728 | B2 | 5/2005 | Roberts et al. |
| 6,991,541 | B2 | 1/2006 | Lind et al. |
| 7,192,348 | B2 | 3/2007 | Brosnan et al. |
| 7,203,361 | B1 | 4/2007 | Meier |
| 7,203,383 | B2 | 4/2007 | Fisher |
| 7,203,663 | B1 | 4/2007 | Buisman et al. |
| 8,192,268 | B1 | 6/2012 | Karpe |
| 8,210,921 | B1 | 7/2012 | Karpe |

*Primary Examiner* — Justin Myhr
(74) *Attorney, Agent, or Firm* — E. Victor Indiano; Indiano & McConnell LLC

(57) ABSTRACT

A gaming ticket dispensing device is provided for dispensing tickets having prize-revealing characters and a removable covering for hiding the prize-revealing characters prior to acquisition by an end user. The ticket dispensing device includes a storage mechanism for holding a plurality of gaming tickets. A revealer is provided for removing the removable covering to reveal the prize-revealing characters, and a scanner is provided for scanning the prize-revealing characters. A processor is in communication with the scanner for processing the scanned characters' information to determine a prize value associated with the characters scanned. An audio visual display displays an audio visual message relating to the prize value and a dispensing port is provided for dispensing the gaming ticket to the user.

19 Claims, 14 Drawing Sheets

PULL TAB TICKET HANDLER AND REVEALER WITH COMPUTER GENERATED DISPLAY

I. REFERENCE TO RELATED APPLICATIONS

This Application claims the benefit of U.S. Provisional Application No. 61/957,587, filed on 8 Jul. 2013, which is incorporated herein by reference in its entirety.

II. TECHNICAL FIELD OF THE INVENTION

This invention relates to gambling devices, and more particularly to pull tab ticket vending machines, as well as casino video games and devices that simulate casino video games.

III. BACKGROUND OF THE INVENTION

Lotteries have been adopted by many state governments as a means of generating additional tax revenue for projects such as highway construction, new schools, and public works programs. As state lotteries have proliferated, lotteries have employed a series of pull tab games that closely resemble casino style gaming machines in their play.

Commonly, lotteries issue instant win game tickets containing characters indicating whether a prize has been won. The Characters are obscured so that they are not readily visible to persons prior to their purchase of the ticket. The characters may be obscured paper "pull tabs" secured by perforated edges which must be torn or burst. The purchaser "plays" the lottery ticket by purchasing it, and removing the covering to reveal the characters showing whether the card is a winner. If the card contains a winning combination of characters, the player may redeem it for the prize designated.

Pull tab instant tickets are also utilized in charitable games, promotional sweepstakes, bingo parlors, and bars where allowed by law.

From a competitive standpoint, the pull tab ticket suffers from a number of drawbacks. These drawbacks can be appreciated by comparing instant win tickets to their main legal competition, regional casino facilities. Casinos offer similar games, but in a much easier to use system. Either an attendant or machine tells the player how to play and whether they have won. The player is not required to read fine print and figure out rules. Additionally, casino games allow a more fast-paced game play than instant pull tab tickets. Moreover, casino machines include lights, computer graphics, and sound to stimulate player interest, something not possible with a pull tab ticket.

A number of vending machines for selling instant pull tab tickets have been patented. Most of these machines operate similarly to existing non-gambling vending machines, as their primary two functions are to collect money and to dispense a purchased item, which in the case of a pull tab ticket machine is a pull tab ticket. Typically, the purchaser inserts money and pushes buttons on the machine to indicate the type of ticket and number of tickets desired. The machine then vends the tickets, and the purchaser receives whatever change is appropriate. Patents disclosing this type of vending machine include U.S. Pat. Nos. 5,222,624, and 6,886,728.

Patents have also been issued for devices to remove the waxy material from scratch-off tickets. Such patents include U.S. Pat. Nos. 4,765,842, 5,253,383, 5,355,543, 5,402,549, 5,907,882. These devices are adequate as an alternative to manual removal of the scratch-off material, but are not believed to be fast enough or thorough enough to allow the high-speed scanning and vending of tickets required for operation in connection with the device of the present invention.

Additionally, patents have also been issued for devices that simulate slot machine play from information supplied by a central computer server (see, for example, U.S. Pat. Nos. 6,733,385, 6,991,541, 7,192,348). These machines are usually considered class III gambling devices, requiring expensive and onerous state licenses, or adoption by the state lottery commission in the jurisdictions where they are implemented.

Patents have also been issued for devices that use a proprietary ticket design to reveal a computer barcode printed on a ticket (see. e.g. U.S. Pat. No. 5,980,385). The ticket design utilized by these machines is proprietary and non-standard, and is not widely accepted or legal outside of certain Native American gaming establishments in the United States.

Many patents have been issued for scanning devices and optical character recognition programs that convert barcode or printed text into a computer graphic display. See, for example, U.S. Pat. Nos. 7,203,663, 7,203,383, and 7,203,361 for recent patents in this area.

Applicant has been issued U.S. Pat. Nos. 8,210,921 and 8,192,268 which describe two possible methods for removing the covering pull tabs from a pull tab instant ticket, passing the ticket through an optical scanning device, reading the characters contained thereon, vending the ticket, and displaying the results by means of computer generated audiovisual display.

The present application expands on U.S. Pat. Nos. 8,210,921 and 8,192,268, as well as describing a new apparatus, encompassing two methods of utilizing pull tab instant tickets in conjunction with a optical scanner and computer display to simulate a slot machine. In the preferred embodiment of the apparatus these two methods are combined in one machine, but could be produced and marketed in separate machines.

The first method of utilizing pull tab tickets the apparatus accepts payment, mechanically opens the pull tab ticket inside the vending machine, optically scans the ticket, displays the ticket results in a computer graphics display, and vends the ticket.

When performing the method of utilizing pull tab tickets the apparatus passes a previously opened pull tab ticket through an optical scanner and utilizes a printing device or specialized preprinted ink to reveal the results of the pull tab ticket on the ticket in human readable characters. The ticket ejects once the optically scanned results are displayed on a computer graphics display.

It is the hope that the present invention will bridge the gap between paper-based gambling methods such as pull tab tickets, and computer based video gaming devices. It is believed that the device would have the benefit of adding the excitement of an actual video game machine to the sale and distribution of instant tickets.

IV. SUMMARY OF THE INVENTION

In accordance with the present invention, an apparatus encompassing two methods of revealing and displaying pull tab tickets is provided for pull tab tickets having prize-revealing characters and a removable covering for hiding the prize-revealing characters prior to acquisition by an end user.

In the first method of utilizing pull tab tickets, a ticket dispensing device comprises a storage mechanism for holding a plurality of gaming tickets, and a revealer for removing the removable pull tab to reveal the prize-revealing characters. A scanner is provided for scanning the prize-revealing characters, and a processor in communication with the scanner is provided for processing the scanned characters' information to determine a prize value associated with the characters scanned. An audio visual display is provided for displaying an audio visual message relating to the prize value, and a dispensing port is provided for dispensing the game ticket to the end user.

Preferably, the apparatus also includes a transporter for transporting the gaming tickets between the storage mechanism, the revealer, the scanner and the dispensing port. Optimally, a preferred embodiment of the device can be designed to contain a storage mechanism that is capable of storing gaming tickets either as a roll of joined gaming tickets, or as a stack of tickets. Additionally, a preferred embodiment of the present invention includes a revealer that is capable of removing a material sheet covering of a "pull tab" type ticket.

One feature of the first preferred embodiment of the present invention is that the device is capable of vending pull tab type lottery tickets, along with being able to reveal the prize of the tickets prior to dispensing the ticket, or alternately, dispensing the ticket without revealing the prize. When the end user selects to reveal the prize, the prize-revealing characters contained on the ticket that are revealed by the revealer can be optically scanned, and understood by a central processing unit within the device. Once the prize is understood by the processing unit, the prize result (if any) can be displayed on a graphic display, that may be accompanied by audio signals.

An additional feature of the first method of utilizing pull tab tickets is that the device has funds handling capabilities to enable the machine to accept coins and currencies, and to allow the player to make repeated purchases of tickets, until the player decides to "cash out", or to request change.

Another feature of the first method of utilizing pull tab tickets in the present invention is that it includes a storage device that can be designed to accommodate a plurality of tickets. These tickets can be placed in the storage device either as a roll, or as a stack.

In the second method of utilizing pull tab tickets, the invention accepts from the user a previously opened pull tab ticket into a ticket acceptor and passes the ticket before an optical scanner.

In the method of utilizing pull tab tickets, a pull tab ticket of novel design is used to motivate purchasers to use the apparatus to reveal the prize contained on the ticket.

In the second method, the pull tab ticket can hold a plurality of prize outcomes, each of which will be displayed in succession on the computerized display.

In the second method of utilizing pull tab tickets, the ticket passes an optical scanner, and the ticket is visibly marked to reveal the total dollar value of prizes contained thereon, as well as to obscure the optically scanned portions to prevent reinsertion in the apparatus.

In the second method of utilizing pull tab tickets, the pull tab ticket may be visibly marked after scanning by use of chemically developed ink, thermally developed ink, or a computer controlled printing device connected to the scanner.

In the second method of utilizing pull tab tickets, the visibly marked ticket is transported to a computer controlled portal. The tickets will be released by the portal gate into the ticket retrieval bin once all prizes contained on all tickets inserted by the user have been displayed on the computer audio/video display.

In the second method of utilizing pull tab tickets, the user can insert a finite number of tickets in succession, and after that display the results the plurality of prizes represented on the tickets in succession on the computer audio/video display. Once all prizes are displayed, the all tickets are released by the computer controlled portal to the retrieval bin.

In the second embodiment, any pull tab ticket that has been visibly marked by the apparatus will be rejected if inserted again into the apparatus ticket acceptor.

In the second embodiment, printed numbers on the pull tab ticket may alternatively be compared to a printed matrix posted conspicuously at the location of sale to reveal the prizes contained on the ticket.

In a most preferred embodiment of the present invention, the audio signals and graphic displays representing the results of the pull tab tickets are similar to the audio signals and graphic displays that are typically associated with video gambling machines, and that are believed to stimulate player interests. The combination of the ticket's value being revealed, along with the audio and visual displays, helps to incorporate fast pace, sound, light and computer graphics into the ticket buying experience, to provide a casino-like gambling machine, that nevertheless operates with non-casino type games such as lottery and privately sold pull tab tickets.

The present invention has the potential to bring a casino-like experience to non-casino locations. It is believed that this casino-like experience will help to stimulate the sale of pull tab tickets, thus benefiting lottery organizers (typically a state government), charities, bingo parlors, fraternal organizations, and other retailers legally allowed to sell pull tab type tickets. The present invention could also be utilized by retailers to offer a sweepstakes type promotion where state laws allow.

An additional feature of the present invention is that the device is capable of assisting a player in determining whether a purchased ticket is a winning ticket.

A further feature of the present invention is that it includes a computer that is easily programmable. This easy programmability of the computer will enable the user to upload new information (as necessary) both to improve the performance of the device, and also to accommodate different types of games, different types of tickets, and different types of prize situations.

Another feature of the present invention is that it can be designed to be placed within and fit within machine cabinets and housing of different sizes. For example, the device can be designed to fit into a standard size slot machine cabinet. By placing it in a slot machine sized cabinet, the size of the machine would draw an association between the user and the intended purpose of the machine, to thereby help to stimulate sales. Alternately, the device can be designed to be placed in a smaller, table top container, so that it can be used in situations where table tops are available, such as in bars, and restaurants. As another alternative, the device of the present invention can be configured for placement in a soft-drink machine-sized cabinet. The placement of the machine in a larger, soft drink machine-sized cabinet that is approximately the size of a full-sized 26 cubic foot refrigerator would have the primary effect of enabling the device to maintain a larger amount of inventory, thus enabling the device to accommodate a very wide variety of games, or else to contain a large enough inventory of gaming tickets to go for long periods of time before needing to be refilled, or else, to provide sufficient inventory for contained operation for a substantial period of time in high volume ticket sales situations.

These and other features of the present invention will become apparent to those skilled in the art upon a review of the best mode of practicing the invention perceived presently by the Applicant, that is described in more detail below in the Drawings and Detailed Description of Preferred Embodiment.

V. DRAWINGS

Figure 7B:
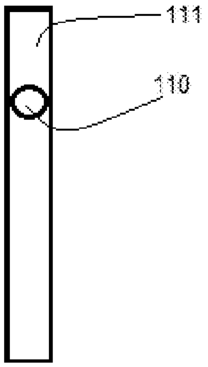
Figure 7A:
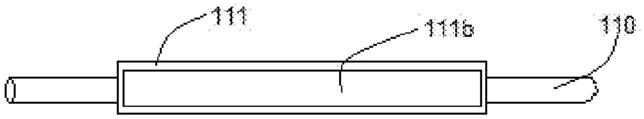

FIG. 7*a* is the revealer gate 111 from the front edge showing the opening 111*b* on the anterior end that receives the opened ticket.

Figure 10:
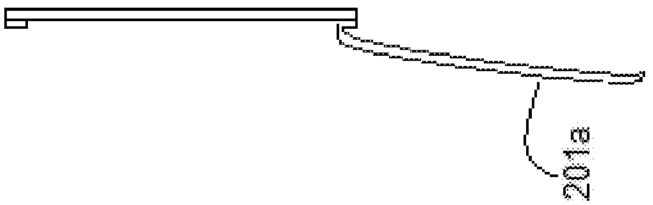
Figure 9:
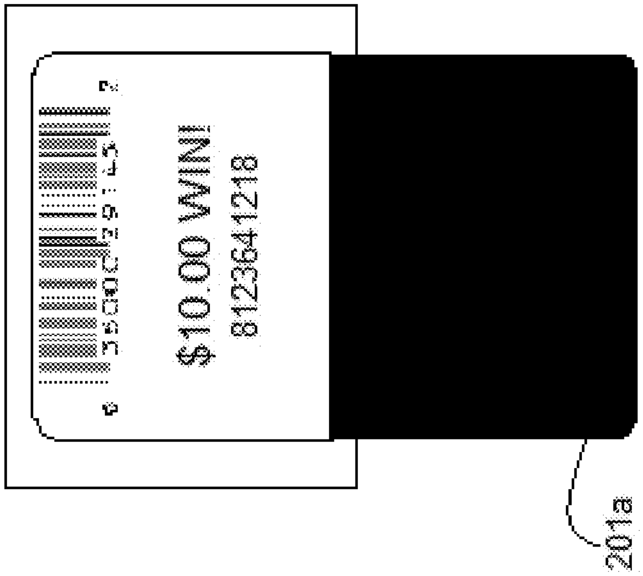
Figure 8:
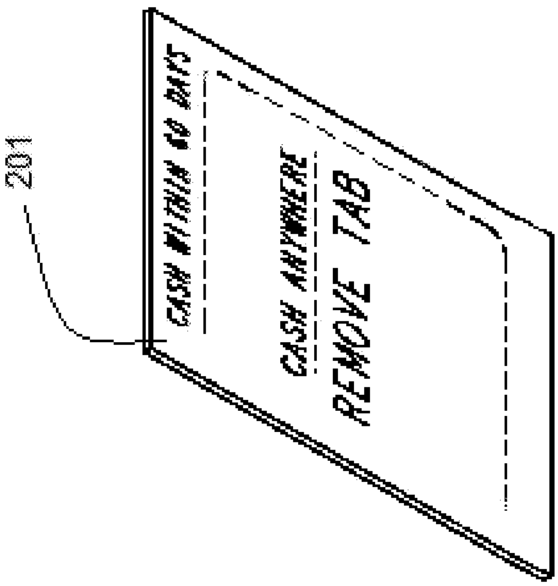
Figure 11:
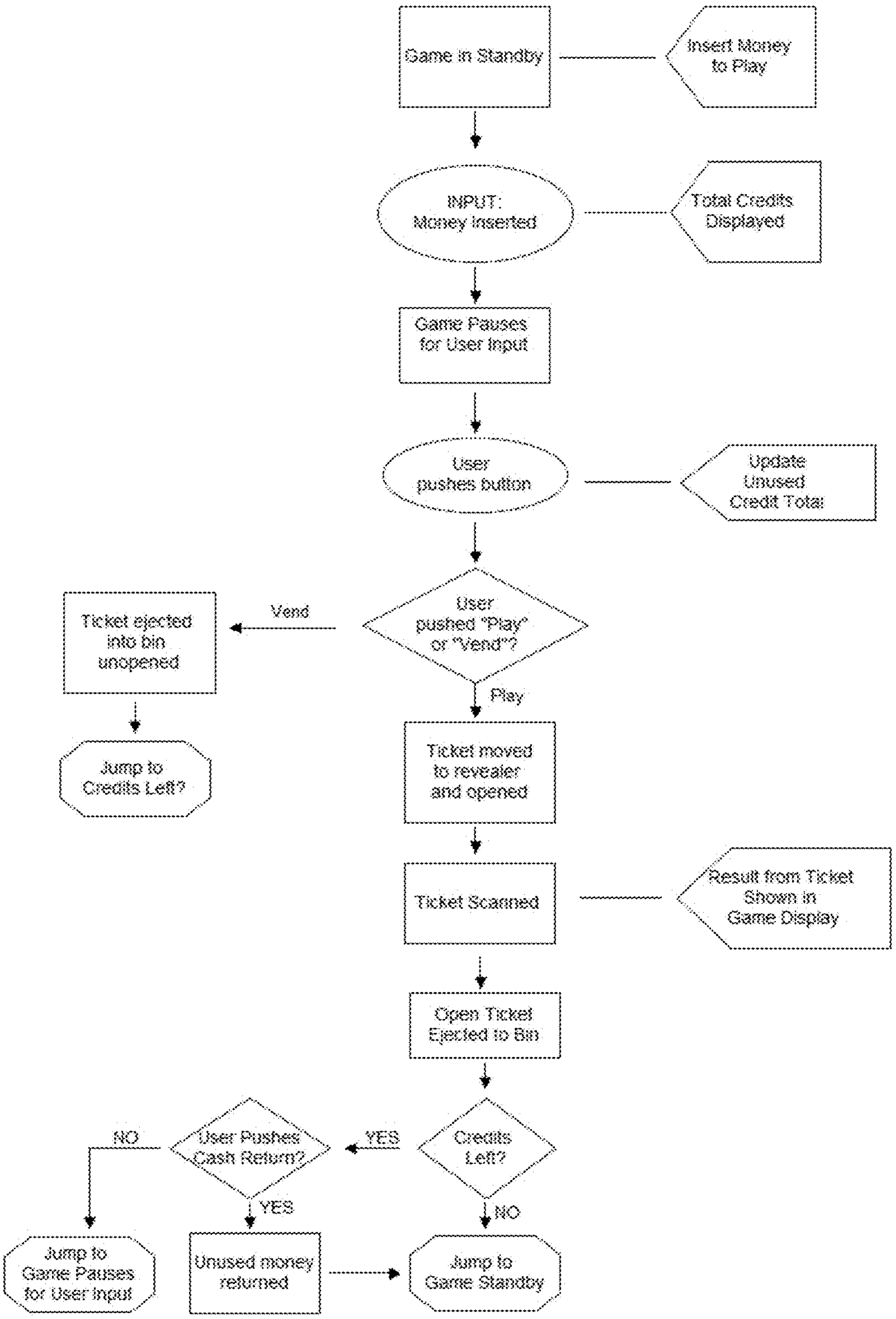
Figure 13:
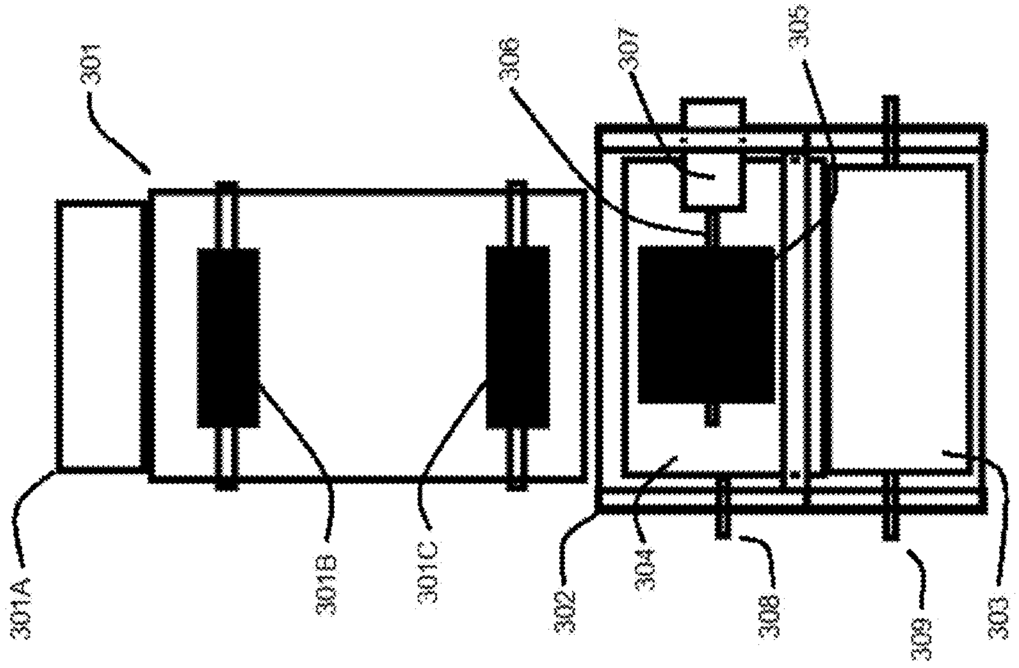
Figure 12:
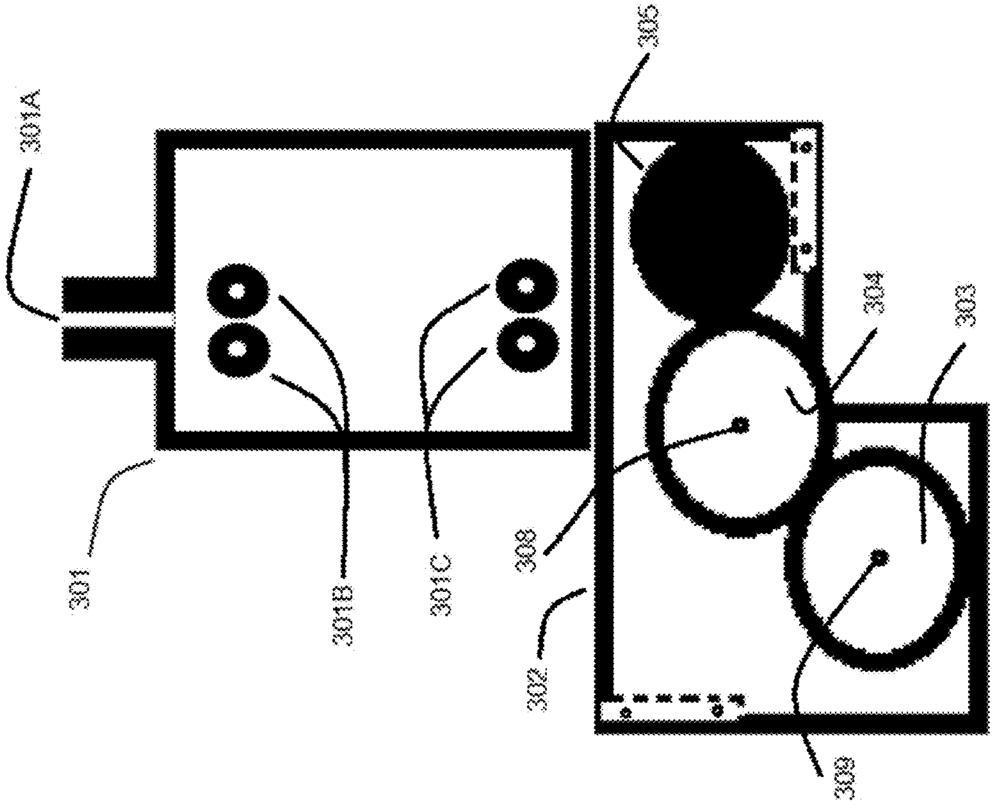
Figure 15:
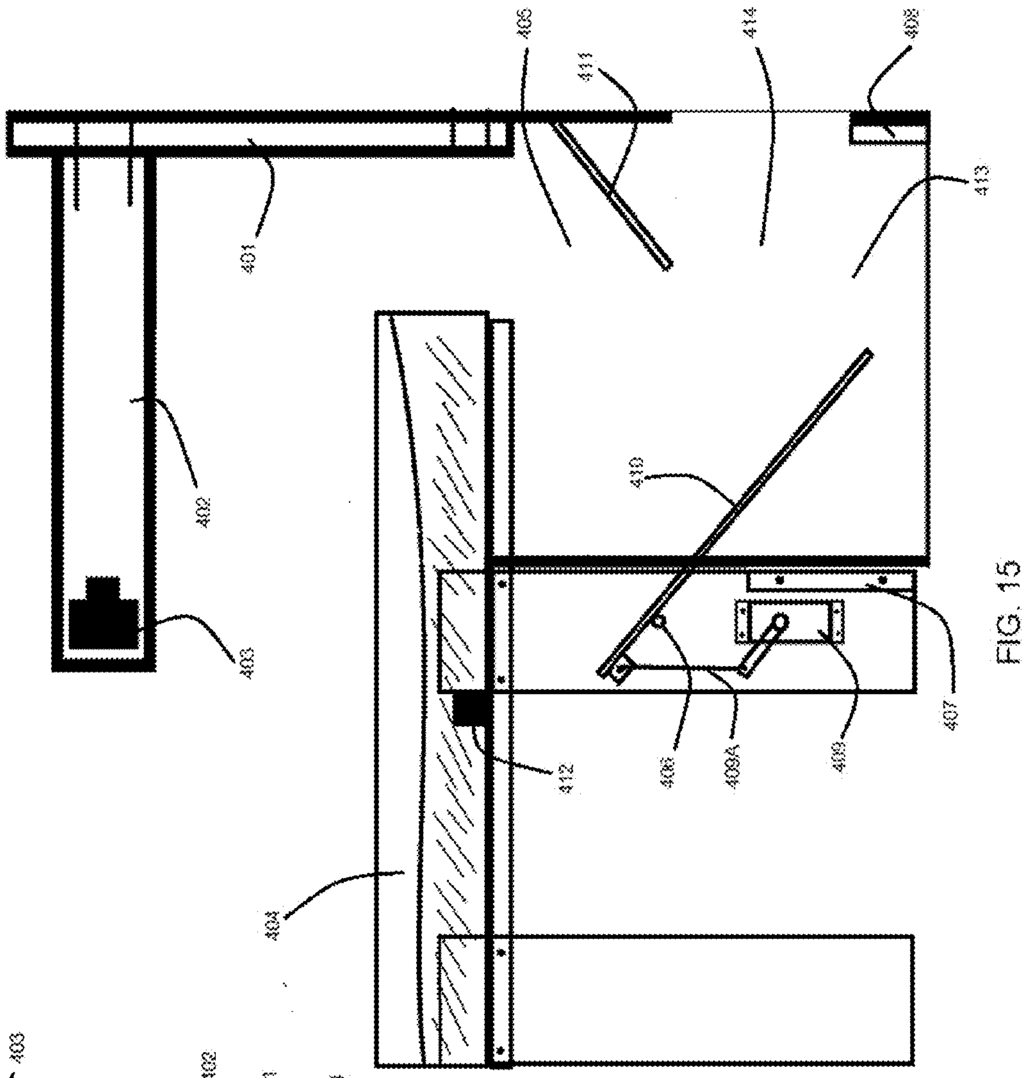
Figure 14:
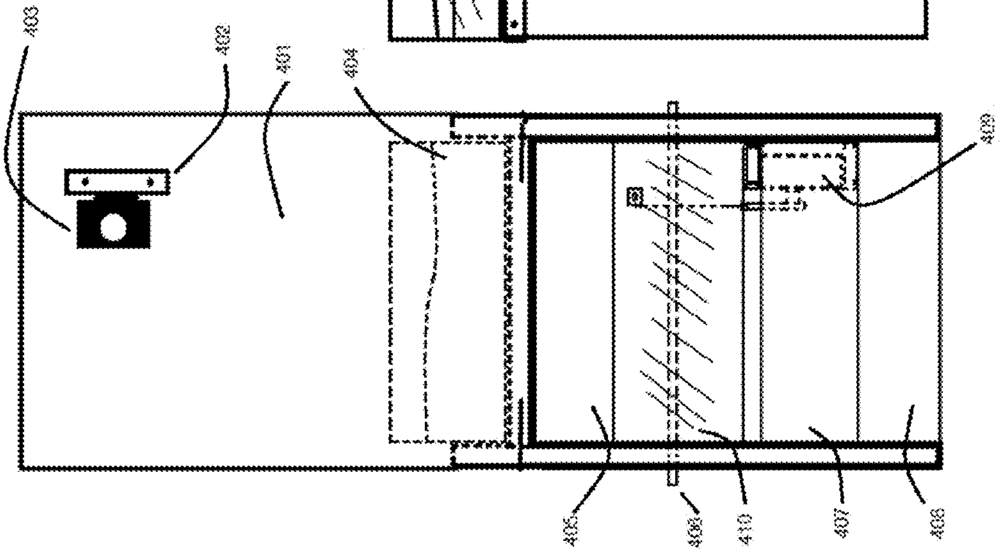
Figure 17:
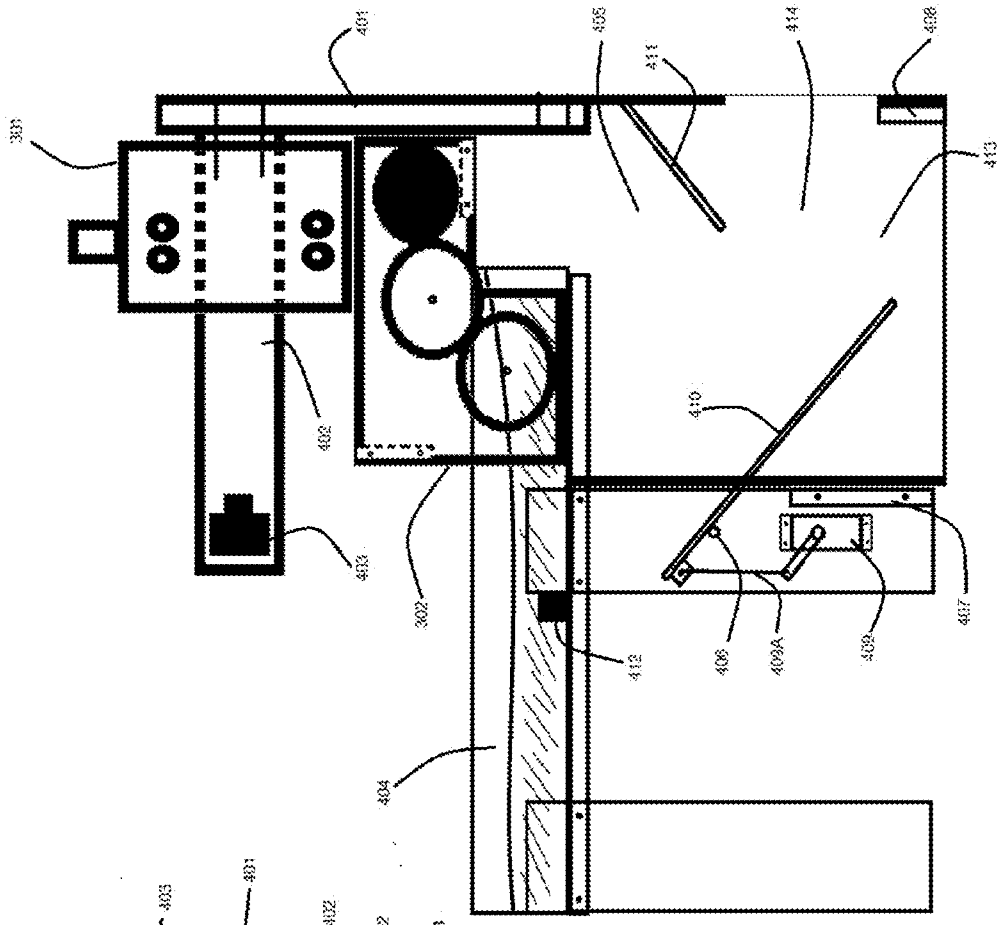
Figure 16:
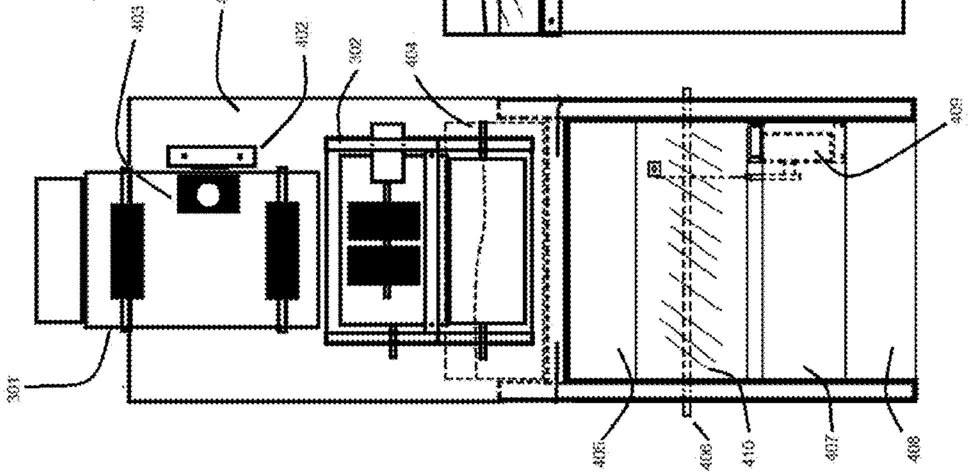
Figure 18:
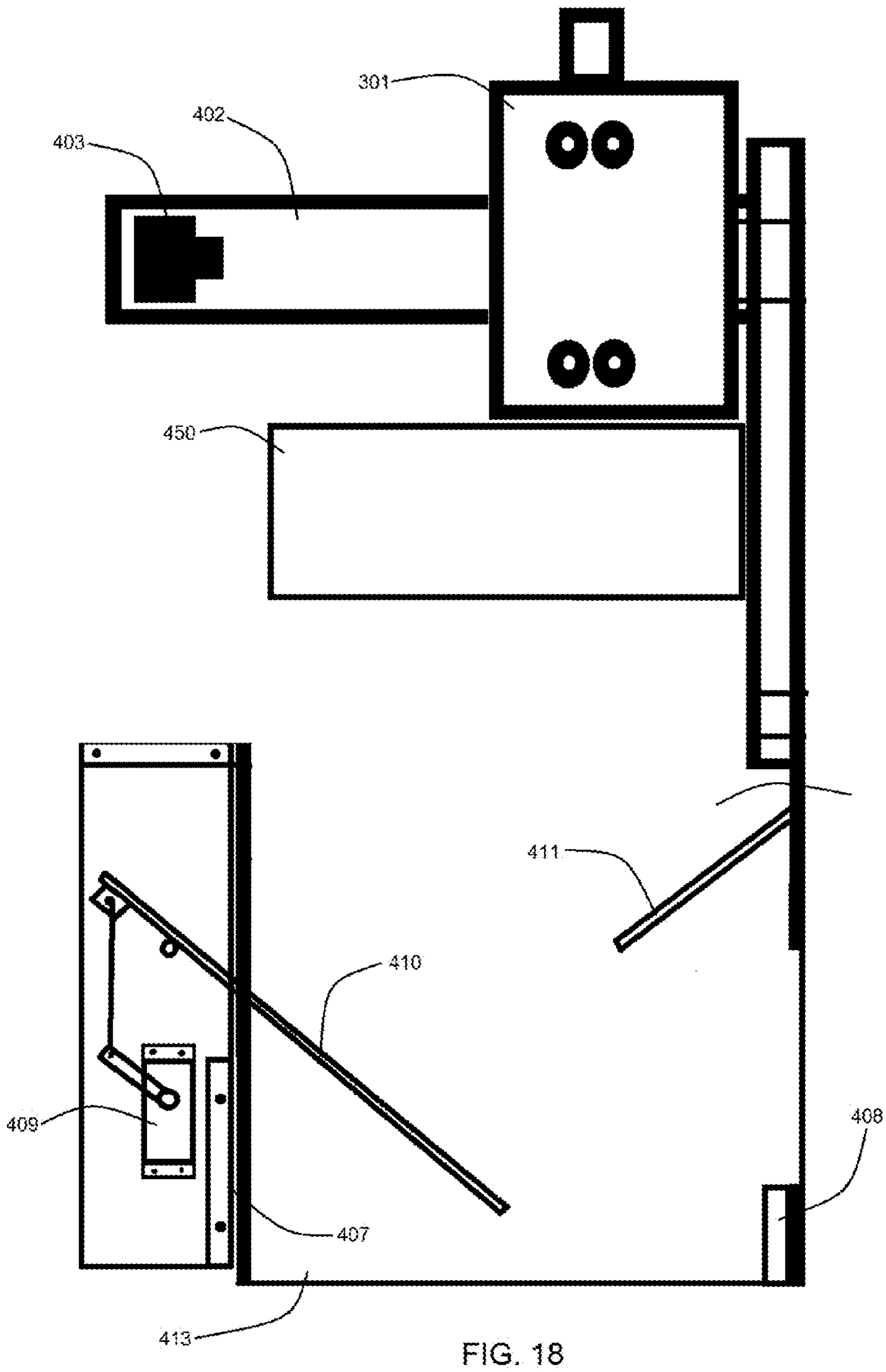
Figure 21:
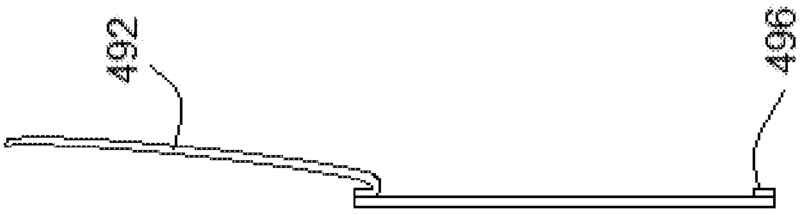
Figure 20:
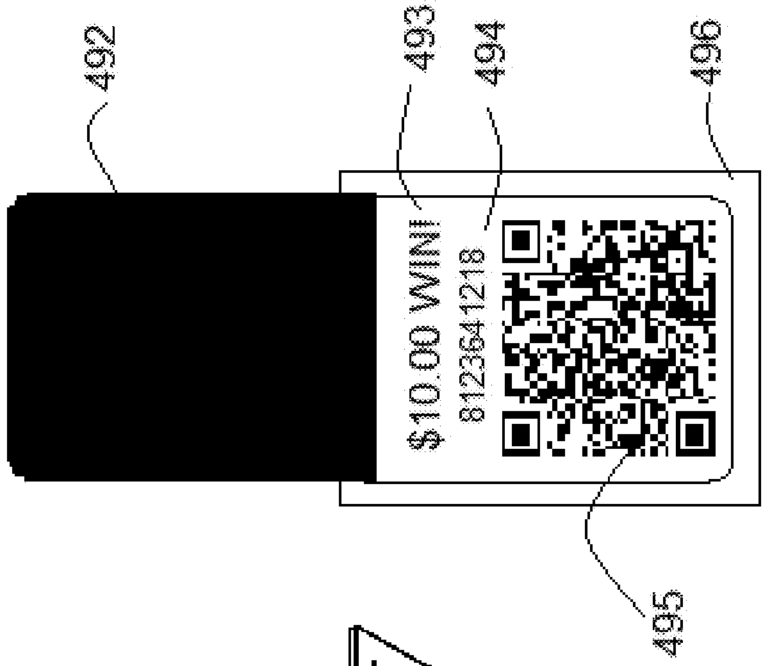
Figure 19:
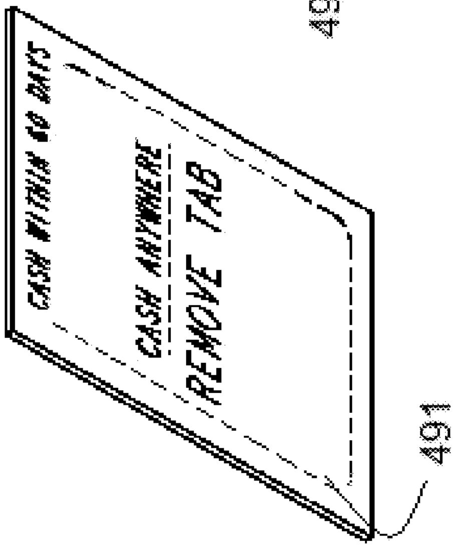
Figure 22:
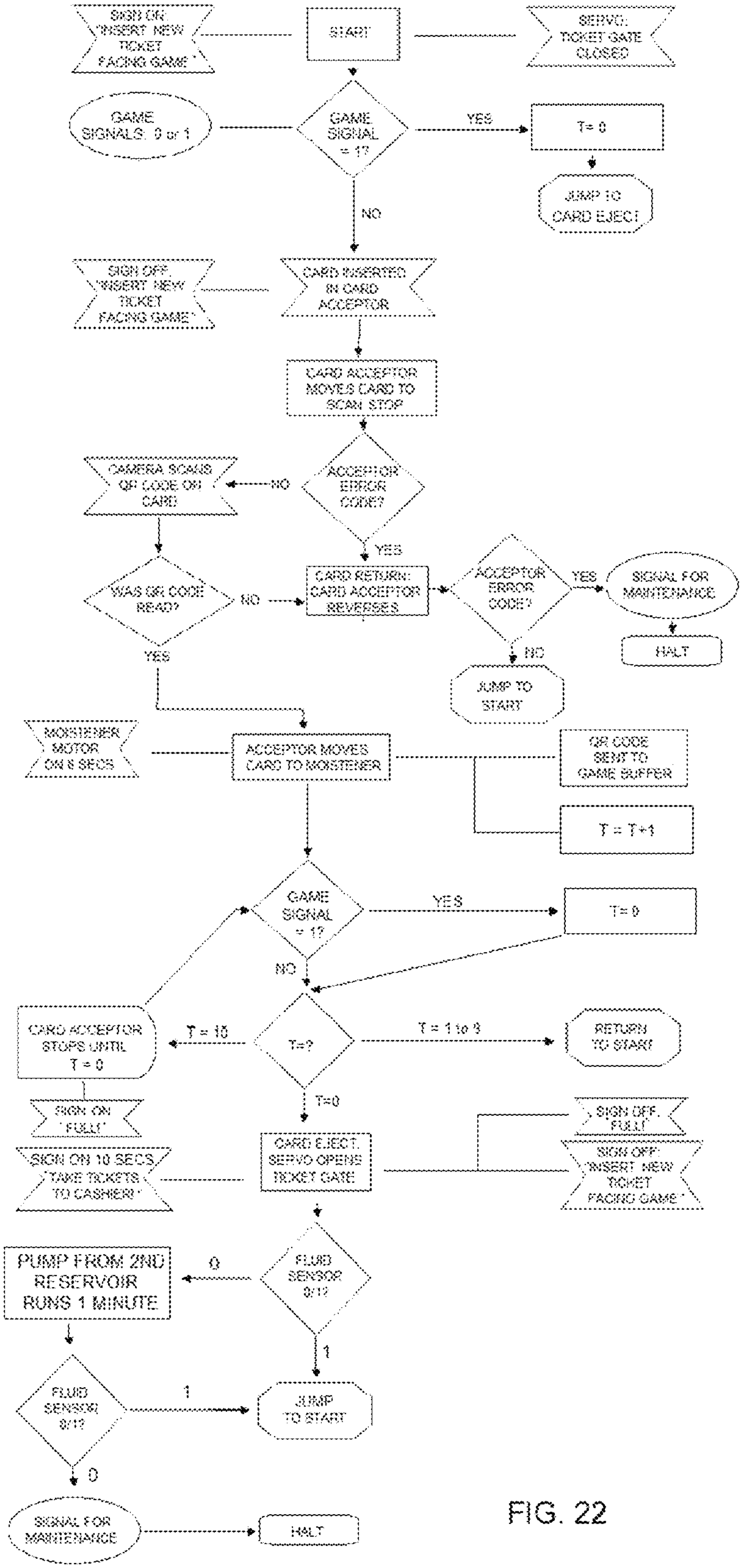
Figure 23:
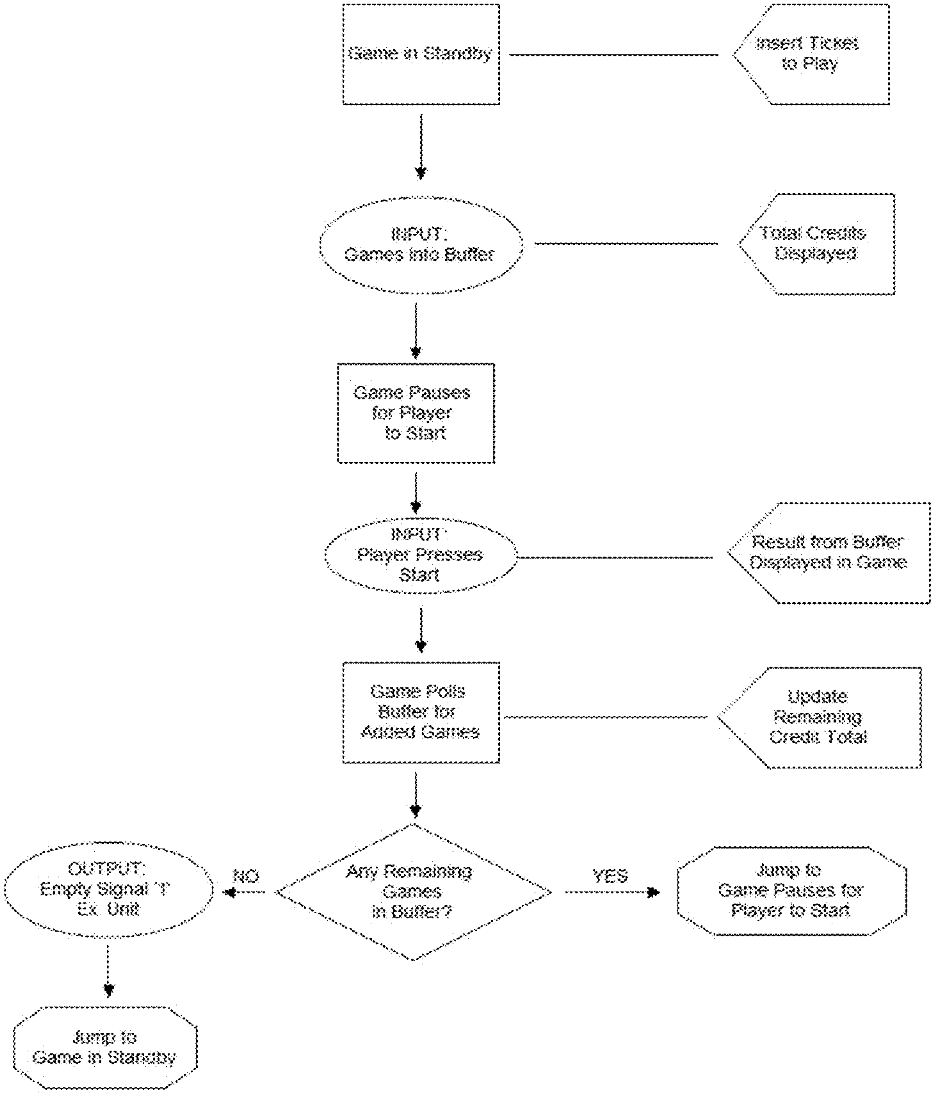
Figure 24:
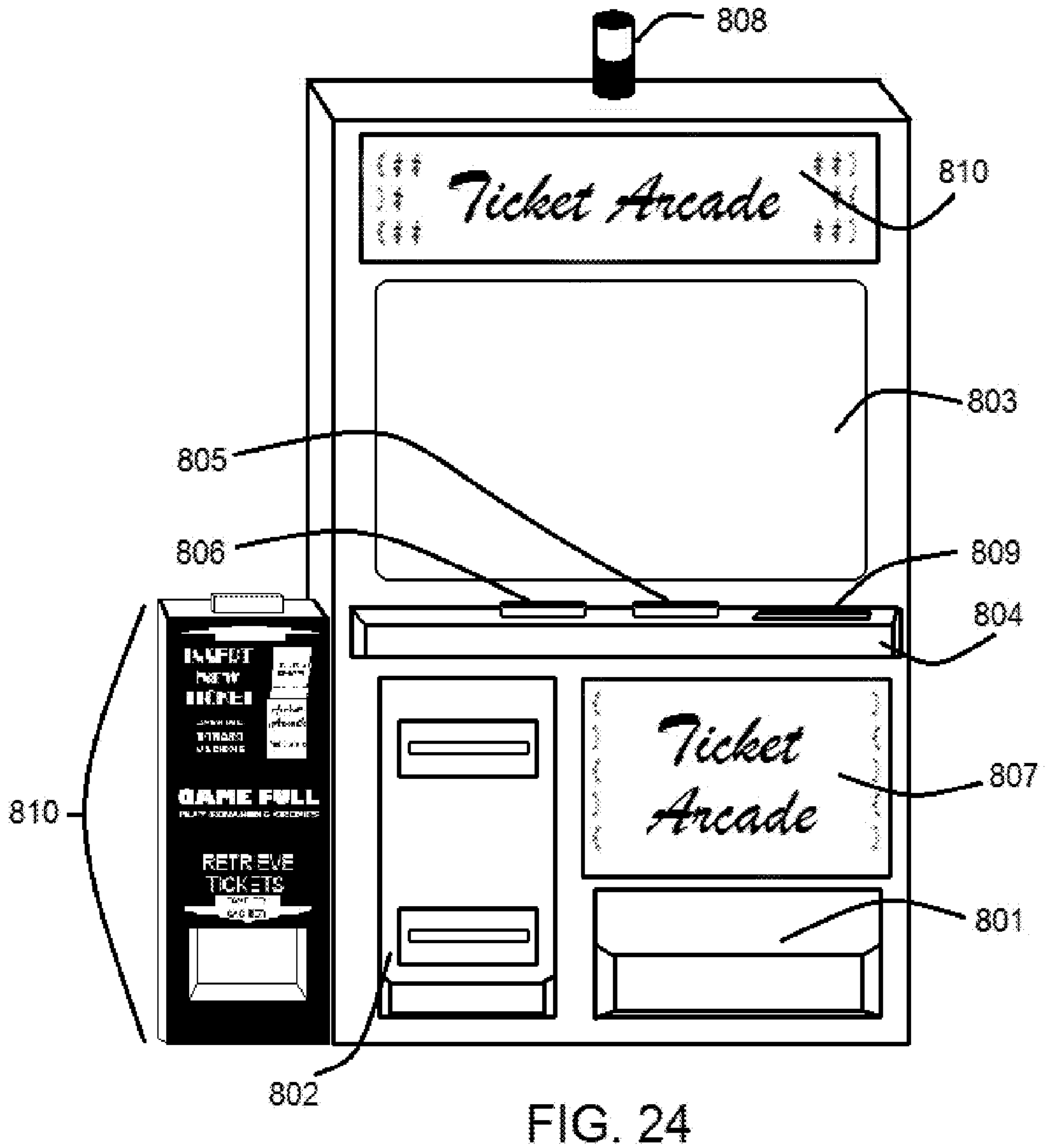
Figure 25:
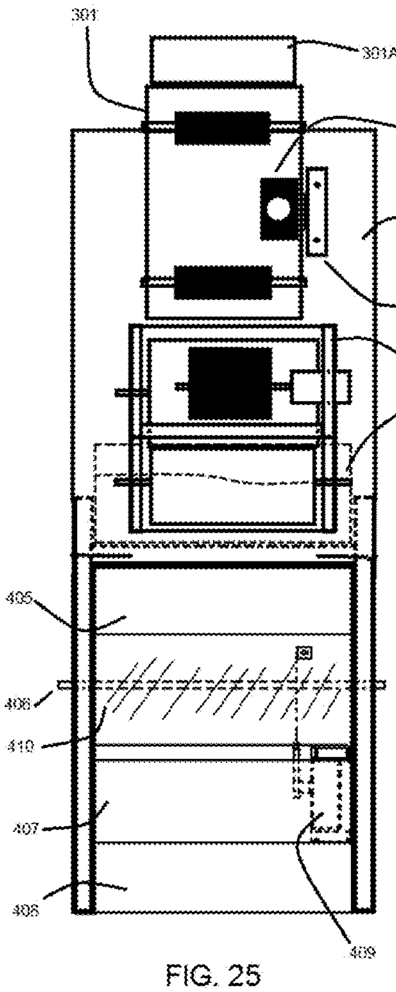
Figure 26:
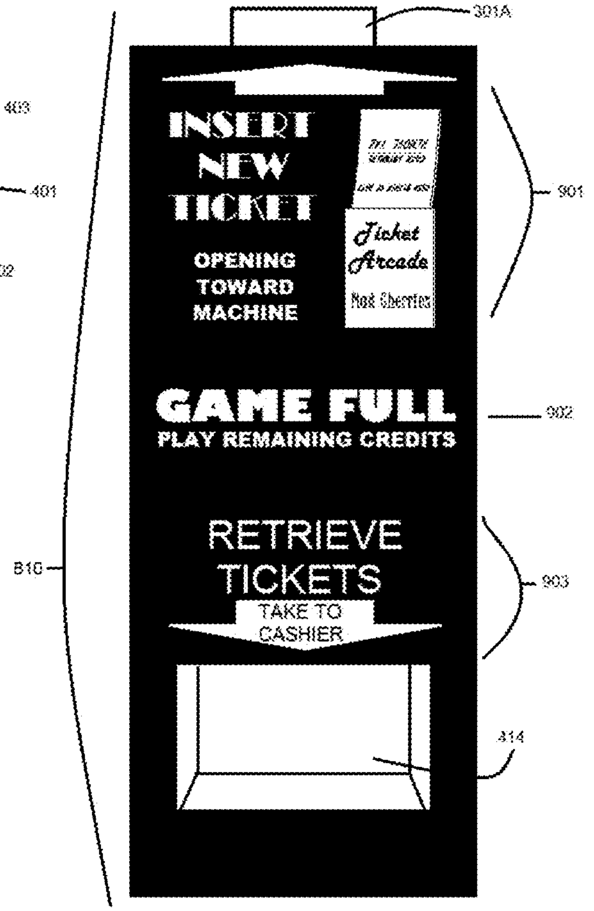
Figure 27:
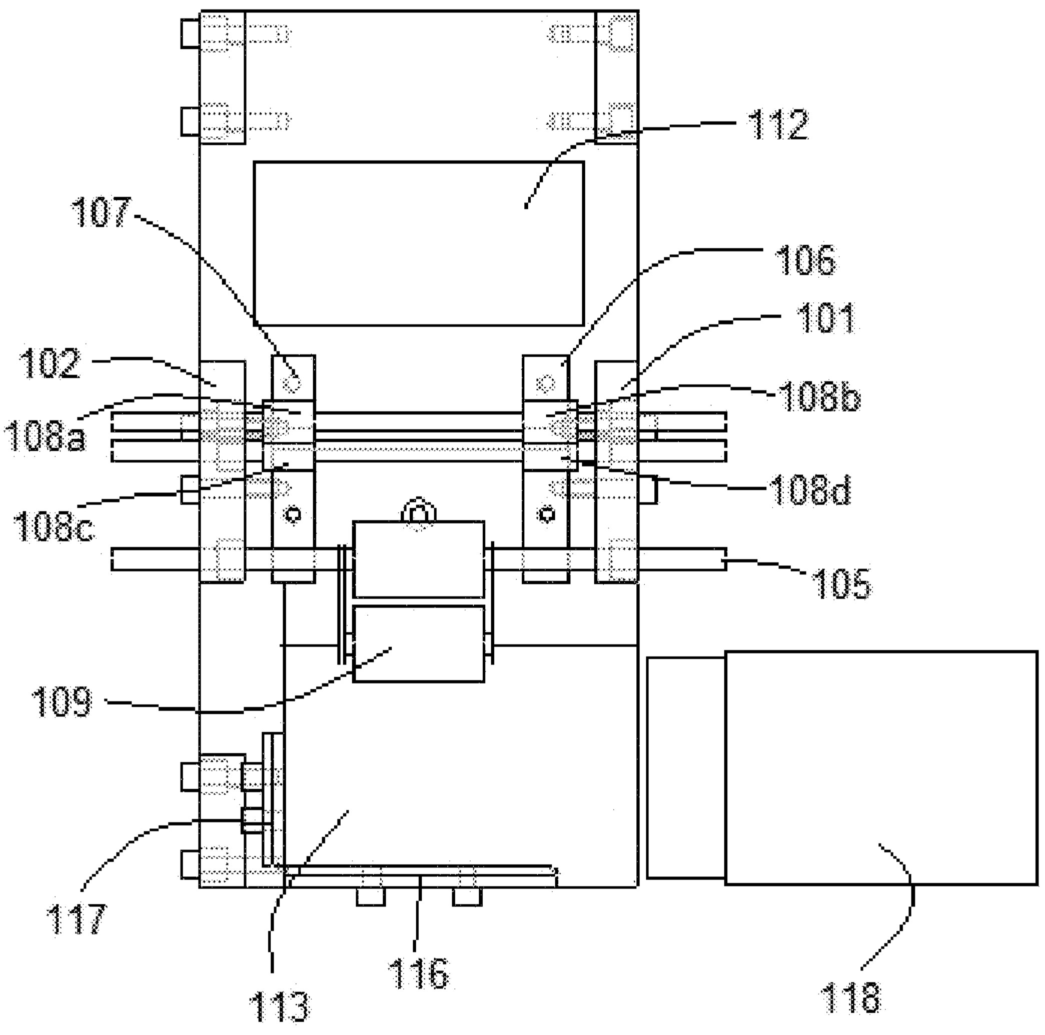

FIG. 7*b* is the revealer gate 111 from the right edge;

FIG. 8 is an unopened revealer ticket for use in the first method of revealing pull tab tickets. Note that the pull tab non-perforated edge is oriented along the length of the ticket, and that the edges along the width of the perforated edge are wider, to allow more area for pinch rollers 108*a*, 108*b*, 108*c*, and 108*d* to grip the ticket edge when pushing the ticket up ticket ramps 106 and 107;

FIG. 9 is the same revealer ticket opened. Note that the barcode is oriented adjacent to the length of the perforated edge, to ease scanning after the ticket is mechanically opened;

FIG. 10 is the same revealer ticket opened edge sectional view, showing the laminate and substrate around the edges;

FIG. 11 flowchart for ticket revealer/scanner utilizing the first method of revealing pull tab tickets, showing the software sequence which controls the mechanism;

FIG. 12 is the ticket collector and moistener/developer utilizing the second method of revealing pull tab tickets, sectional view side;

FIG. 13 is the ticket collector and moistener/developer utilizing the second method of revealing pull tab tickets from the front;

FIG. 14 is the superstructure from the front of the second apparatus for revealing pull tab tickets, which supports the ticket collector and moistener/developer, reservoir, gate 410 and gate servo 409;

FIG. 15 is the same superstructure from the side;

FIG. 16 is the combined ticket collector, scanner, moistener/developer, and superstructure utilizing the second method of revealing pull tab tickets from the front;

FIG. 17 is the same combined ticket collector, scanner, moistener/developer, and superstructure from the side;

FIG. 18 shows an alternate configuration of the ticket collector and scanner utilizing the second method of revealing pull tab tickets, with thermal ink developer or printer rather than a moistener/developer to make the ticket results visible;

FIG. 19 is the unopened ticket for use in the second method of revealing pull tab tickets, from front;

FIG. 20 is the opened ticket for use in the second method of revealing pull tab tickets from front;

FIG. 21 is the open ticket for use in the second method of revealing pull tab tickets sectioned along the length;

FIG. 22 is flowchart for the second method of revealing pull tab tickets;

FIG. 23 is the flow chart for the computerized audio/visual display unit working with the second method of revealing pull tab tickets;

FIG. 24 is the exterior of the unit;

FIG. 25 is a repeat of FIG. 16, replicated here to show the interior and exterior of the ticket revealer utilizing the first method of revealing pull tab tickets from the same profile, side by side;

FIG. 26 is the exterior of the ticket revealer utilizing the first method of revealing pull tab tickets, showing the point of insertion into the ticket collector 301, the light up signs providing the state of the game, and the ticket retrieval bin;

FIG. 27 is the is the ticket revealer utilizing the first method of revealing pull tab tickets from overhead, showing the placement of the pull tab ticket dispenser (a dispenser widely available from a number of commercial manufacturers) (gate 111 and scanner/camera 115 not present);

VI. DETAILED DESCRIPTION

Figure 1:
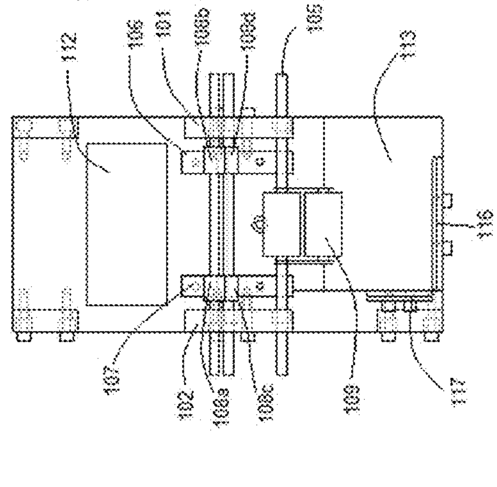
FIG. 1 is the ticket revealer utilizing the first method of revealing pull tab tickets from overhead (gate 111 and scanner/camera 115 not present)

A schematic representation that will serve as a review for the ticket revealer is shown in FIGS. 1 through five. The first method ticket revealer device is provided for opening and displaying the results of pull tab tickets such as those displayed in FIGS. 8 through 10.

FIG. 8 shows the ticket presale with laminate cover unopened. FIG. 9 shows the pull tab ticket opened.

Figure 3:
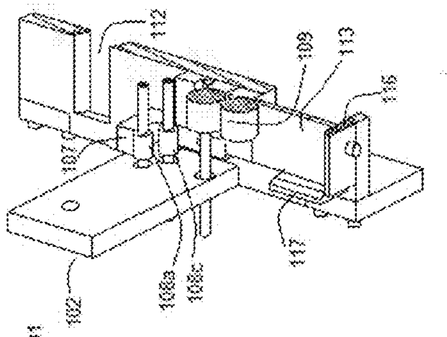
FIG. 3 is the ticket revealer utilizing the first method of revealing pull tab tickets from right angle perspective, sectional view (gate 111 and scanner/camera 115 not present)
Figure 2:
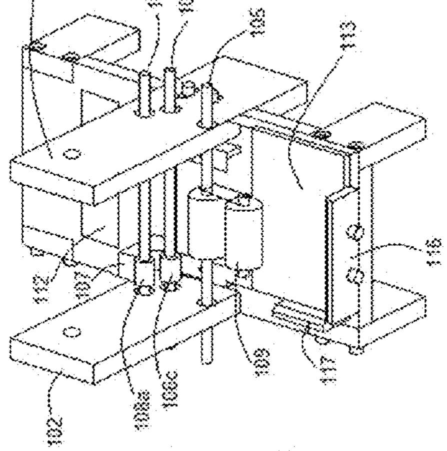
FIG. 2 is the ticket revealer utilizing the first method of revealing pull tab tickets at right angle (gate 111 and scanner/camera 115 not present)
Figure 4:
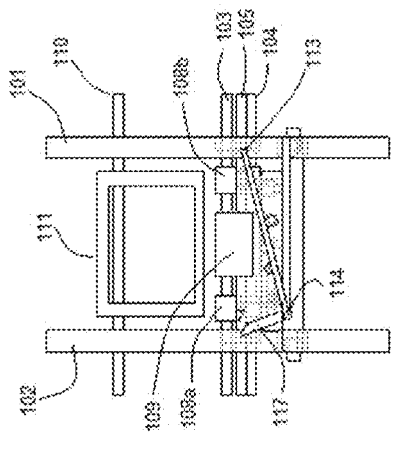
FIG. 4 is the ticket revealer utilizing the first method of revealing pull tab tickets from the anterior end (116 backstop not present)

Starting with the portion of the ticket revealer closest to the viewer (the anterior end) in FIGS. 2, 3, and 4, the ticket is deposited from the ticket dispenser 118 (shown in FIG. 27), on the receiving bed/gate 113. The ticket bed is surrounded on two sides by backstop 116 and end stop 117 which keep the ticket aligned and prevent it from sliding off the ticket bed. Once the ticket is on ticket bed 113, take-up roller 109 engages pulling the unopened ticket toward left and right ticket ramps 106 and 107. As the ticket travels up the ticket ramps, it is pushed along and forced to conform to be concave shape of the ramps by pinch rollers 108*c* and 108*d*. Take-up roller 109 and pinch rollers 108*a*, 108*b*, 108*c*, and 108*d* are driven by a motor to rotate the rollers in a counter-clockwise direction when faced from the right side, to propel the ticket forward and up the ticket ramps. Forcing the ticket to conform to the concave shape of the ticket ramps 106 and 107, causes the ticket laminate cover material to separate from the ticket substrate along its perforated boundaries.

Figure 5:
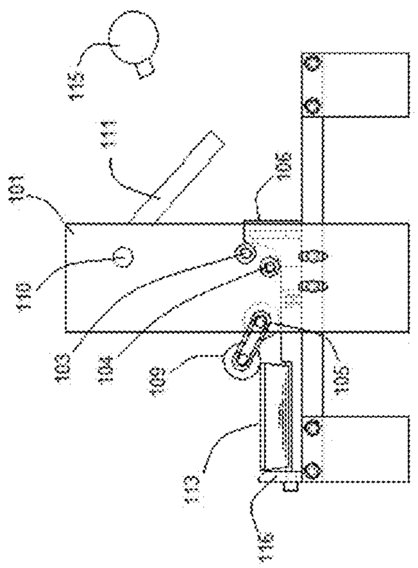
FIG. 5 is the ticket revealer utilizing the first method of revealing pull tab tickets from the right side.
Figure 6:
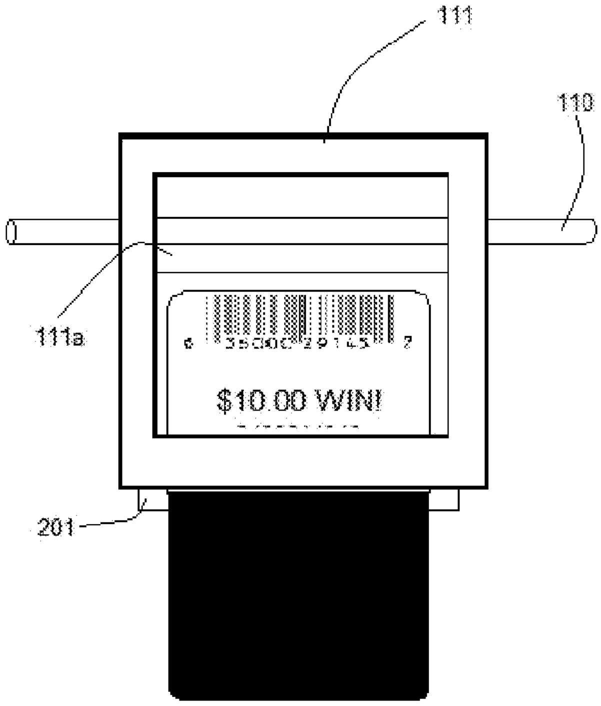
FIG. 6 is revealer gate 2 from posterior end (facing scanner/camera) with ticket, showing the ticket window 111*a;*

The opened pull tab ticket is then caught in ticket gate 111 (see FIG. 6). The open ticket and ticket gate 111 is oriented toward camera/scanner 115, which scans the ticket and relays the information to the game processor. Once the ticket is successfully scanned ticket gate 111 pivots toward in the posterior of the ticket revealer on an axle 110. FIG. 5 shows gate 111 in the pivoted position. This allows the opened tickets to drop through portal 112 to the retrieval bin 801 where it may be retrieved by the purchaser. FIG. 5 shows take-up roller 109 in its ready position, awaiting an unopened ticket to be placed on ticket bed 113. Ready position is achieved by rotating axle 105 clockwise as shown in FIG. 5 (seen from the right side), lifting the anterior roller of take up roller 109 off ticket bed 113. In this position the unopened ticket may be deposited on the ticket bed 113 under the take-up roller. Once the ticket is on ticket bed 113, axle 105 (as well as 104 and 103) are rotated counterclockwise to the position as shown in FIG. 5, causing the end of take-up roller 109 to rotate downward onto the ticket and propel the ticket forward.

Alternatively if the purchaser chooses to vend the ticket without opening, ticket bed 113 opens upward from the right side as shown in FIG. 5 allowing the unopened ticket to bypass the ticket revealer and instead pass into a portal to be dropped directly into the retrieval bin where it can be taken by the purchaser. End stop 117 is attached to ticket gate/bed 113, and moves with 113 when it is opened. Backstop 116 is not attached to 113, and stays stationary through this process.

Ticket gate 111 is a rectangular box open at the anterior end to receive the open ticket and further separate the pull tab laminate cover from the substrate. Additional separation is achieved because the ticket substrate goes into the open end of ticket gate 111 while the separated laminate cover stays outside a gate 111, wedging the ticket open. Ticket gate 111 has a window on the posterior side which allows the opened ticket to be viewed by ticket scanner/camera 115. Ticket gate 111 includes axle 110 along the width of the posterior end. This axle allows the ticket gate to be pivoted forward after the ticket is scanned to drop the ticket into the ticket portal 112 and down to the retrieval bin.

Once the card is scanned, the ticket results are communicated to the game processor where they are incorporated into the audio/visual display of the game.

Moving to the second method of revealing pull tab tickets, FIGS. 12 and 13 show the front and top new of the card collector and moistener/developer 301. This is a commonly available card collector machine. In this cutaway view of 301 we can see the front and rear pinch rollers 301B and 301C which propel the ticket through the card collector. The ticket is inserted by the user into 301A, and is transported between the front and rear pinch rollers 301B and 301C, where it is paused for scanning by camera/scanner 403 (seen in FIGS. 14 and 15).

Once scanned the ticket is moved through to 302 ticket moistener/developer. 302 ticket moistener/developer is composed of two passive foam rollers which touch each other causing them to rotate in opposite directions on axles 308 and 309. Drive roller 305 is made of a non-absorbent anti-slip material which will maintain fraction in moist conditions, and is directly connected by an axle to motor 307. An alternative gear or pulley drive system may also be used. Roller 305 remains in contact with roller 304 along its length. As seen in FIG. 12 roller 305 rotates in a counterclockwise motion causing passive rollers 304 and 303 to rotate as well. As seen in FIG. 17, roller 303 sits in a reservoir of liquid solution. Rotation of rollers 303 and 304 causes the liquid from the reservoir to be transferred to roller 304. It is deposited on any ticket which passes between roller 304 and drive roller 305. Liquid deposited on the opened side of the pull tab ticket then causes invisible ink on the open ticket to be developed to a visible state, as well as obscuring the ticket bar code so the ticket cannot be played again.

FIGS. 14 and 15 show the superstructure of the card collector moistener/developer.

FIGS. 16 and 17 show the card collector moistener/developer together with the superstructure which includes reservoir 404 and ticket gate 410. Once a ticket passes through ticket collector 301 and ticket moistener/developer 302, it will be held in holding area 405 until the results of the ticket are shown in the computerized audio/visual display. If a maximum number of tickets are in holding area 405 and one or more ticket results have not been shown in the computerized audio/visual display, ticket collector 301 will accept no further tickets until all tickets in 405 have been displayed and passed to the retrieval bin 413. Once all tickets in holding area 405 are so displayed, servo 409 pulls the linkage to gate 410 on axle or 406 and the tickets are released into retrieval bin 413 where the customer may retrieve them. Servo 409 then closes gate 410 and the unit is ready for insertion of more tickets.

Below is a description of all of the numbered parts presented in the drawings.

101 is the right riser to which rotating axles 110,103,104, and 105 are secured by a bearing.

102 is the left riser to which rotating axles 110,103,104, and 105 are secured by a bearing.

103 is the top rotating axle which drives rollers 108*a* and 108*b*, pulling the ticket up the ticket ramps 106 and 107 and into ticket gate 111.

104 is the bottom rotating axle which drives rollers 108*c* and 108*d*, pushing the ticket up the ticket ramps 106 and 107.

105 is the axle for take-up roller set 109.

106 is the right ticket ramp.

107 is the left ticket ramp.

108*a*, 108*b*, 108*c*, and 108*d* are pinch rollers made of a semi-rigid flexible material. The mechanism could alternatively incorporate rollers opposing rollers 108*a*, 108*b*, 108*c*, and 108*d* built into right and left ticket ramp.

109 is the take-up roller set. When axle 105 rotates clockwise (as seen from the right side) the anterior roller lifts up into ready position. (seen in FIG. 5). When the axle 105 rotates counterclockwise the roller drops down onto the ticket propelling it toward the ticket ramps 106 and 107.

110 is the axle for gate 111.

111 is the second gate which holds the open ticket for scanning and then pivots to drop the ticket into portal 112 and into retrieval bin 801 (seen in FIG. 24).

111*a* is the window in the posterior side of gate 111 that allows the camera/scanner 115 to see the open face of the ticket

111*b* is the opening at the bottom of ticket gate 111 that accepts the open ticket 201 substrate after it moves from ticket ramps 106 and 107. The laminate flap 201*a* will pass outside of opening 111*b*.

112 ticket portal to retrieval bin 801.

113 is the first gate/bed. When this gate is open (as seen in FIGS. 4 and 5) the ticket will bypass the revealer and go directly into the retrieval bin unopened.

114 is the first gate hinge.

115 is the scanner/camera.

116 is the backstop to the ticket bed 113 to position and restrain the ticket as it moves from ticket dispenser 118 (see FIG. 27).

117 is the end stop to the ticket bed 113 to position and restrain the ticket as it moves from ticket dispenser 118 (see FIG. 27).

118 is the pull tab ticket stack dispenser (a dispenser widely available from a number of commercial manufacturers) (see FIG. 27).

201 is the pull tab ticket designed for the first device for revealing pull tab tickets (FIGS. 1 through 7 above). See notes under FIG. 8 above for details.

201*a* is the flap created when the laminate cover obscuring the ticket results is separated along its perforated borders, and the pull tab ticket is opened.

301 is the ticket collector (commercially available). As part of the second method of revealing tickets, this collector pulls in the ticket where it is scanned, and then passed on to the ticket moistener/developer.

301A is the ticket input slot where the user inserts the opened ticket.

301B is the front pinch rollers of the ticket collector.

301C are the rear pinch rollers of the ticket collector.

302 is the ticket moistener/developer.

303 is the fluid uptake roller. It sits in reservoir 404 and when it rotates it transfers developer fluid to moistener/developer roller 304. It is made of an absorbent elastic material such as a synthetic foam.

304 is the ticket moistener/developer roller. It transfers developing fluid to the ticket as the ticket passes between rollers 304 and 305.

305 is the drive roller. It is made of a flexible non-absorbant material. As seen in FIGS. 12 and 17, it rotates counterclockwise, causing roller 304 to rotate clockwise and 303 to rotate counter-clockwise.

306 is the drive axle connecting the motor and drive roller 305.

307 is the drive motor.

308 is the moistener/developer roller axle.

309 is the liquid uptake roller axle.

401 is the ticket collector/moistener/developer base. This is where the ticket collector and moistener/developer are mounted.

402 is the camera/scanner riser. This is where the camera/scanner is mounted to view the ticket when it passes through ticket collector 301.

403 is the camera/scanner which scans the bar code or characters on the pull tab ticket.

404 is the developing fluid reservoir and reservoir support

405 is the ticket holding area. Scanned tickets held in this area by gate 410 until all scanned ticket results have been shown on the computerized audio/visual display.

406 is the axle for the 410 ticket gate.

407 is the retrieval bin backstop.

408 is the retrieval bin front stop

409 is the gate servo that moves gate 410.

409A is the linkage for servo 409 to gate 410.

410 is the ticket gate.

411 is the ticket gate stop (not shown in FIG. 14). This is what ticket gate 411 rests against when it is closed.

412 is the developer fluid level sensor. It will sense when the developer fluid reservoir is nearing empty, and either actuate a pump to refill the reservoir or signal for maintenance if the reservoir does not refill within a certain period.

413 is the ticket retrieval bin, where users retrieve their tickets to take to the cashier.

414 is the retrieval bin access opening. This is the opening in the front of the mechanism where the user inserts their hand to retrieve the tickets from the retrieval bin.

450 is the thermal ink developer (heating unit) or printer that may be used instead of the chemically developed ink method previously described here.

Dashed line 491 is the perforated edge where ticket covering laminate separates and is removed from the ticket substrate.

492 is the ticket laminate pulled back from the perforated edges and opened.

"$10.00 WIN!" indicia 493 represents the area of reverse printing of the ticket results in chemically developed ink. This area and indicia 493 are developed into a visible image by passing the ticket through the machine. This ink of indicia 493 is invisible until developed with a second solution placed on the ticket by moistener/developer 302. For instance the reverse invisible ink preprinted on the card could be ascorbic acid (with citric acid to prevent oxidation). The developer solution could be iodine (mixed with benzoflavone to maintain color) which will color the areas where the ascorbic acid has not been pre-printed. Ideally the substrate will be made of a paper with suitably high starch content to be colored by the iodine where not treated by the ascorbic acid. Other two step chemical combinations for developing ink are available. Thermally activated ink could also be used (see FIG. 18 for an alternative configuration using a heating unit to thermally develop the ink).

494 is the ticket results number. It is a series of numbers (letters or other characters could also be used) printed in regular ink which can be compared to a publically posted matrix at the location where the pull tab ticket is sold to determine how much (if any) money was won from the ticket without aid of the machine.

495 is the barcode area printed in regular ink, where the results from each slot game are read by the scanner/camera. Alternatively this area could be any character(s) that could scanned or optically recognized by a computer. The area will also be colored by the chemical transferred by the moistener/developer, to obscure the barcode and prevent rescanning of the same ticket.

496 is part of the area where glue has been applied between the laminate and substrate which has remained around the edge of the substrate after the laminate has been separated at the perforation and pulled back.

801 is the ticket retrieval bin for the first method of revealing the ticket, as set forth in FIGS. 1 through 11 above.

802 is the credit card/money accepter and change return.

803 is the touch screen video monitor where the ticket results are displayed.

804 is the control mantle where the control buttons are located.

805 is vend without play button. When it is pushed the pull tab ticket will be passed directly to the retrieval bin without going through the first method revealer (FIGS. 1 through 11) and being opened.

806 is the play button. Pressing this button after the required amount of money is deposited in money accepter 802 sends a ticket though the first method revealer and scanner (FIGS. 1 through 11).

807 is the game cabinet belly artwork.

808 is the service light. This light flashes when the machine requires maintenance.

809 is the instruction panel. It is a small sign telling the user how the game works, and containing any legal disclaimers.

810 is the cabinet and front of the unit for the second method of revealing pull tab tickets (shown in FIGS. 12 through 23). This portion can be seen in detail in FIG. 26.

901 is the "Insert New Ticket—Opening Toward Machine" sign. The sign lights up when the unit for the second method of revealing pull tab tickets is ready to accept more tickets. The sign could be supplemented or replaced with a graphic on the game display.

902 is the "Game Full—Play Remaining Credits" sign. It comes on when the maximum number of tickets have been inserted but not yet displayed in the unit for the second method of revealing pull tab tickets. The sign could be supplemented or replaced with a graphic on the game display;

903 is the "Retrieve Tickets Below—Take to Cashier" sign. It comes on when all tickets in the unit for the second method of revealing pull tab tickets have been displayed and passed to the ticket retrieval bin. The sign could be supplemented or replaced with a graphic on the game display.

What is claimed is:

1. A gaming ticket display device which will also accept, scan and reveal the results of pull tab gaming tickets having prize relating characters and an identifier, the gaming ticket display device including

- a receiver for receiving a gaming ticket having obscured prize relating characters thereon,
- a scanner for scanning and recognizing the prize relating characters,
- a prize revealer for revealing the prize designated by the prize relating characters,
- a display for producing at least one of an audio and visual display of information relating to the prize designated by the prize relating characters, and
- a marking member comprising a developer applied to the identifier for obscuring the ticket's identifier so that the obscured identifier is recognized by the gaming ticket device as indicating that the gaming ticket has been scanned previously to thereby prevent the ticket from being successfully rescanned.

2. The gaming ticket display device of claim 1 wherein the prize revealer comprises a developer for visually revealing formerly obscured prize revealing characters that were printed on the gaming ticket.

3. The gaming ticket display of claim 1 device wherein the prize revealer comprises a chemical developer for developing invisible prize relating characters into visible prize relating characters, wherein the chemical developer also serves as the developer of the marking member for concurrently revealing the prize relating characters and obscuring the identifier.

4. The gaming ticket display of claim 1 wherein the prize revealing characters comprise a series of characters, and further comprising a matrix to which the series of characters can be compared for determining the prize awarded by the gaming ticket.

5. The gaming display device of claim 1 wherein the gaming ticket is preprinted with at least one of a chemically developed ink, and is also preprinted with at least one of user readable numeric code, bar code and computer readable characters.

6. The gaming display device of claim 1 wherein the gaming ticket is preprinted with a chemically developed ink, and the developer comprises a chemical developer for developing the chemically developed ink of the prize relating characters and to obscure the identifier of the gaming ticket.

7. The gaming display device of claim 6 wherein the gaming ticket identifier comprises is at least one of a user readable numeric code, a bar code and computer readable characters.

8. The gaming display device of claim 1 further comprising a mark recognition member for recognizing marked gaming tickets that are attempted to be passed through the gaming device more than once.

9. The gaming display device of claim 1 wherein the marker includes a liquid applicator for applying the developer in liquid form to both the prize revealing characters and the identifier of the ticket to prevent the gaming ticket from subsequently being successfully re-scanned by the gaming display device.

10. The gaming display device of claim 9 wherein the liquid applicator comprises a roller.

11. The gaming display device of claim 1 wherein the scanner comprises either a scanner or a camera.

12. The gaming display device of claim 1 further comprising a transporter for transporting the gaming ticket through the gaming ticket dispensing device for revealing the prize revealing characters.

13. The gaming display device of claim 1 wherein the display is configured for displaying ticket status, remaining credits, winnings, and instructions relating to ticket retrieval.

14. A gaming ticket display device which will accept, scan and reveal the results of already opened pull tab gaming tickets, the gaming ticket display device including

- a receiver for receiving an opened gaming ticket having obscured prize relating characters thereon,
- a scanner for scanning and recognizing the prize relating characters,
- a prize revealer for revealing the prize designated by the prize relating characters,
- a display for producing at least one of an audio and visual display of information relating to the prize designated by the prize relating characters, and
- a transporter for transporting the gaming ticket through the gaming ticket dispensing device for revealing the prize revealing characters wherein the transporter includes a moistener for applying a chemical developer to the gaming ticket for serving as the prize revealer for revealing the prize designated by the prize revealing characters.

15. The gaming display device of claim 14 wherein the moistener is comprised of sponge-like moistening rollers for transporting and applying the chemical developer to the gaming ticket.

16. The gaming display device of claim 15 wherein the transporter further includes a pair of drive rollers for moving the gaming ticket through the moistening rollers, the drive rollers being comprised of a non-absorbent anti-slip material for maintaining traction on the gaming ticket in moist conditions.

17. A gaming ticket display device which will accept, scan and reveal the results of already opened pull tab gaming tickets, the gaming ticket display device including

- a receiver for receiving an opened gaming ticket having obscured prize relating characters thereon,
- a scanner for scanning and recognizing the prize relating characters,
- a prize revealer for revealing the prize designated by the prize relating characters,
- a display for producing at least one of an audio and visual display of information relating to the prize designated by the prize relating characters, wherein the display device includes a processing means for processing and revealing the prize designated by the prize revealing characters of a batch of gaming tickets in succession, and includes a holder for holding the processed gaming tickets until all of the batch of tickets have been processed.

18. The gaming display device of claim 17 wherein the gaming display device includes a retrieval bin for placing and holding the tickets where the user may retrieve the gaming tickets, and wherein the holder is configured to release the batch of processed and revealed gaming tickets to the retrieval bin after the batch of gaming tickets have been processed.

19. The gaming display device of claim 17 wherein the display produces an audiovisual display that includes information relating to the prize designated by the prize revealing characters, that includes sound, light and computer graphics similar to a casino video gaming machine.

* * * * *